(12) United States Patent
Zimbrón

(10) Patent No.: US 12,005,599 B2
(45) Date of Patent: Jun. 11, 2024

(54) METHODS AND SYSTEMS FOR A WASTE MANAGEMENT SYSTEM

(71) Applicant: Armando Zimbrón, Round Rock, TX (US)

(72) Inventor: Armando Zimbrón, Round Rock, TX (US)

(\*) Notice: Subject to any disclaimer, the term of this patent is extended or adjusted under 35 U.S.C. 154(b) by 479 days.

(21) Appl. No.: 17/319,247

(22) Filed: May 13, 2021

(65) Prior Publication Data

US 2022/0143857 A1     May 12, 2022

Related U.S. Application Data

(60) Provisional application No. 63/111,368, filed on Nov. 9, 2020.

(51) Int. Cl.
*B29B 17/00* (2006.01)
*B26D 1/02* (2006.01)
*B26D 3/11* (2006.01)
*B26D 7/01* (2006.01)
*B26D 7/06* (2006.01)

(52) U.S. Cl.
CPC ............... *B26D 3/11* (2013.01); *B26D 7/01* (2013.01); *B26D 7/0616* (2013.01); *B29B 17/0052* (2013.01); *B26D 1/025* (2013.01)

(58) Field of Classification Search
CPC .......... B26D 3/11; B26D 7/01; B26D 7/0616; B26D 1/025; B26D 7/0666; B29B 17/0052; B29B 2017/044; B29B 17/0412; B29B 2017/0015; B29L 2031/7158; B26F 1/02

USPC .............. 82/46; 83/102, 104, 105, 149, 167, 83/411.2, 947, 92, 93, 94, 95; 30/90.1, 30/90.2, 90.3, 90.4, 90.5, 90.6, 90.7, 90.8, 30/90.9, 91.1, 91.2
See application file for complete search history.

(56) References Cited

U.S. PATENT DOCUMENTS

| | | | | |
|---|---|---|---|---|
| 1,725,114 A * | 8/1929 | Van Gelderen | ...... | H02G 1/1226 30/90.1 |
| 2,470,078 A * | 5/1949 | Hoenselaar | ............... | B26D 3/11 83/374 |
| 3,225,629 A * | 12/1965 | Horrocks | ............. | H02G 1/1226 30/90.1 |
| 3,805,647 A * | 4/1974 | Blanc | ..................... | B26D 3/169 225/2 |
| 4,170,174 A * | 10/1979 | Ditty | ........................ | B26D 3/11 99/594 |
| 5,102,057 A * | 4/1992 | Ellis, III | ................. | B30B 9/325 241/36 |
| 5,125,333 A | 6/1992 | Gourley, III | | |
| 5,740,612 A * | 4/1998 | Takeshita | ................ | B26B 27/00 30/115 |
| 5,784,942 A * | 7/1998 | Jones | ....................... | B26D 7/22 83/932 |
| 8,425,390 B2 * | 4/2013 | Saiia | ........................ | B26D 3/11 493/353 |

(Continued)

OTHER PUBLICATIONS https://www.petbottlerecyclingline.com/wet-granulator/.

*Primary Examiner* — Sean M Michalski
*Assistant Examiner* — Robert D Cornett
(74) *Attorney, Agent, or Firm* — Pierson IP, PLLC

(57) ABSTRACT

Systems and methods for an automated device that reduces a footprint of a bottle by moving linearly moving and rotating the bottle, while a blade cuts a body of the bottle into a continuous strip.

18 Claims, 4 Drawing Sheets

(56) References Cited

U.S. PATENT DOCUMENTS

| | | | |
|---|---|---|---|
| 9,004,385 B2* | 4/2015 | Leshem | B02C 19/0093 |
| | | | 241/266 |
| 9,499,353 B2* | 11/2016 | Fahldieck | B67B 3/02 |
| 10,414,684 B2 | 9/2019 | Nicholas et al. | |
| 10,562,802 B1* | 2/2020 | Nicholas | B26D 7/01 |
| 2013/0134243 A1* | 5/2013 | Leshem | B02C 18/04 |
| | | | 241/47 |
| 2022/0305688 A1* | 9/2022 | Mammolenti | B65G 47/90 |

* cited by examiner

METHODS AND SYSTEMS FOR A WASTE MANAGEMENT SYSTEM

BACKGROUND INFORMATION

Field of the Disclosure

Examples of the present disclosure relate to systems and methods for disposing bottles and reducing volume occupied by waste. Specifically, embodiments are directed towards an automated device that reduces a footprint of a bottle by slicing a bottle. While the bottle is linearly moving and rotating, a blade may cut a body of the bottle into a continuous strip.

Background

The clean, effective and environmentally-proactive disposal of domestic and industrial waste materials provides on-going challenges for industry, national governments, and local authorities. Waste disposal methods such as burying waste in landfills at municipal tips have many drawbacks. These drawbacks include the need for large tracts of land that otherwise be better utilized, the prospect of wind-blown litter, the attraction to rats and other vermin which may provide a health risk to the community, etc.

Furthermore, waste disposal at landfills is inefficient and occupies more space than what is required. For example, waste could be crushed to occupy less space. Conventional methods of reducing the volume of cans include trash compactors. However, it can be an arduous and unsustainable task to compact materials made out of plastics, such as bottles.

Accordingly, needs exist for system and methods for a waste management system that includes a blade that cuts the surface of a bottle as the bottle moves along a linear axis while rotating.

SUMMARY

Examples of the present disclosure relate to systems and methods for a waste management system including a base, linear actuator, rotational actuator, and blade system.

The base may be configured to support and house the elements of the waste management system, such that all of the elements within the waste management system are contained within the base. The base may include an open bottom end, closed upper surface, and closed sidewalls. In embodiments, the open bottom end may be the only functional orifice within the base, and may be configured to receive an intact bottle and allow a condensed bottle to be released from the base. By limiting the openings within the base, the elements within the housing may be protected from outside interference. The base may include a bottle coupling mechanism and internal sidewalls.

The bottle coupling mechanism may include receiving threads. The receiving threads may be configured to receive the bottle's threads on the neck of the bottle. The bottle coupling mechanism may also be configured to rotate responsive to receiving a force from the rotational actuator. In other embodiments, the bottle coupling mechanism may be any device that is configured to receive the neck of the bottle, such as a clamp.

The internal sidewalls may extend from the opening in the bottom end towards the closed top end. The internal sidewalls may act as a guide while the bottle simultaneously rotates, linearly moves, and is sliced.

The linear actuator system may be configured to move the bottle along a first linear axis, wherein the linear axis extends from the open bottom end towards the closed top end of the base. For example, the linear actuator system may be a lead-screw linear rail system. However, in other embodiments, any type of linear actuator configured to move the bottle along the linear axis can be used.

The rotational actuator may be configured to rotate parts or elements the bottle coupling mechanism to allow the bottle to rotate. The rotational actuator may be configured to rotate the bottle in a first direction or a second direction. In embodiments, the rotational actuator and the linear actuator may be configured to operate simultaneously to rotate and linearly move the bottle.

The blade system may include a blade and a blade actuator. The blade includes an edge that is configured to slice a body of the bottle while the bottle rotates and linearly moves. The edge of the blade may be configured to face a first or second direction. Typically, the edge of the blade may face a rotational direction of the bottle. In embodiments, the edge of the blade may be angled upward from a bottom surface of the base.

The blade actuator may be configured to move the blade along a second linear axis, wherein the second linear axis may be orthogonal to the first linear axis. In embodiments, the blade actuator may be configured to move the blade approximately one inch, which may be less than a diameter of the bottle. This movement of the blade by the blade actuator may allow the blade to move from a first position away from the circumference of the bottle to a second position aligned with the circumference of the bottle.

In embodiments, responsive to coupling neck of the bottle with the bottle coupling mechanism, the blade linear actuator may linearly move the blade towards a central axis of the bottle along the second linear axis to align an edge of the blade with the circumference of the bottle. As the bottle rotates and linearly moves, the blade may remain in place and slice the body of the bottle into a single, continuous strip. However, the blade may move along the second linear axis when the bottle is in rotation and moving to assist in cutting the bottle.

Responsive to the bottle moving along a desired length of the first linear axis, the blade actuator system may move the blade along the second linear axis, such that the blade is no longer aligned or interfaced with the bottle. The bottle may then be removed from the waste management system. When the bottle is removed from the waste management system, the bottle may still be a unitary piece formed of a bottom, a body formed of a singular string, and a head. The singular strip forming the body may allow the bottle to occupy substantially less volume, while increasing the exposed surface area of the bottle, and be prepped for other processes and or uses. Once more of the bottle surface area is exposed and the volume occupied by the bottle is decreased, the bottle may be more efficiently and effectively processed through further waste management systems.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
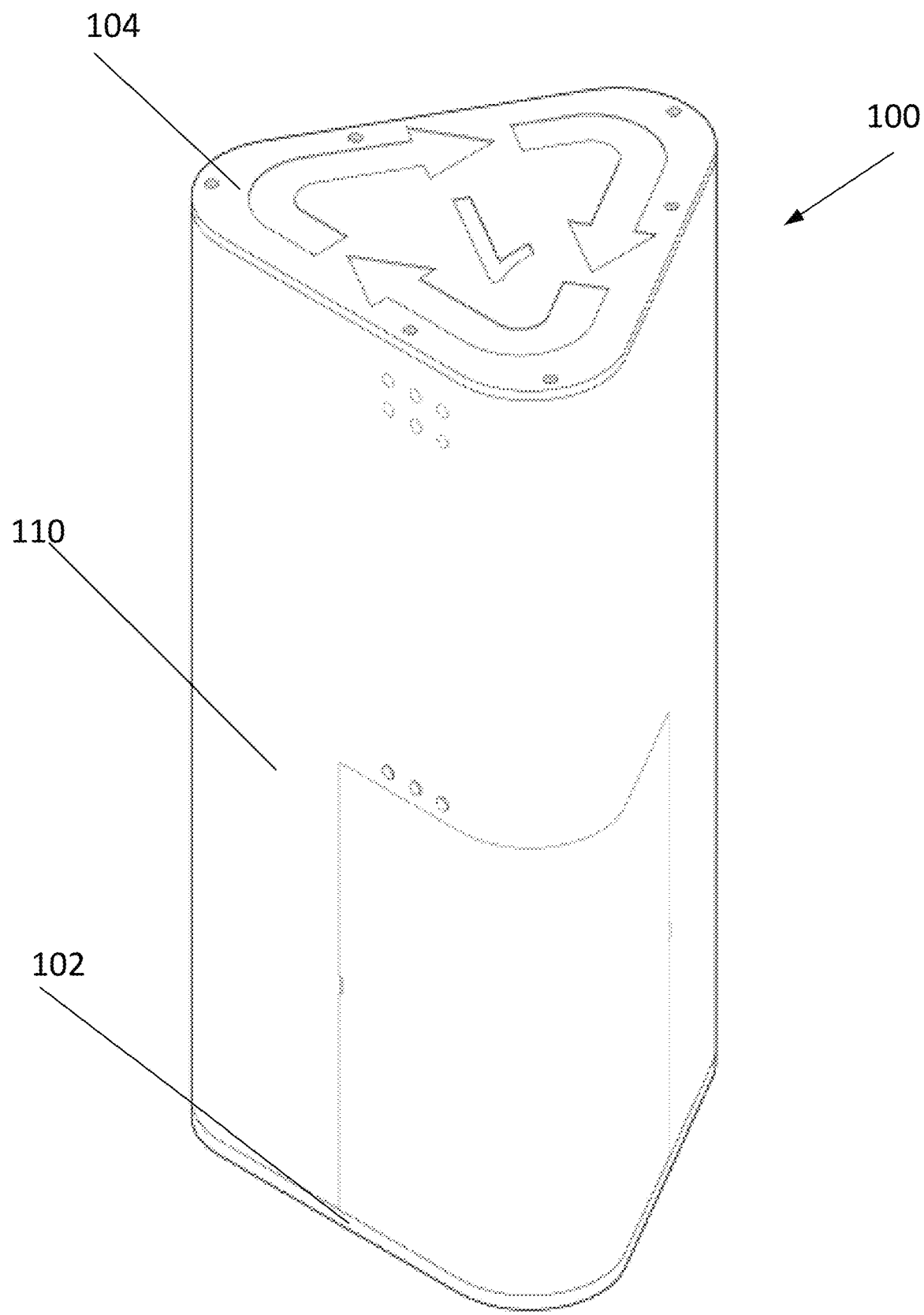
FIG. 1 depicts a waste management system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

FIG. 1 depicts a waste management system 100, according to an embodiment. Waste management system 110 may include a base 110, wherein base 110 includes an open bottom end 102 and a close top end 104. Open bottom end 102 may allow a bottle to be positioned within base 110 and retrieved from base 110. Closed top end 104 may limit that amount of exposed surfaces of base 110. As such, the open bottom 102 end may be the only functional orifice within base 110, and may be configured to receive an intact bottle and allow a condensed bottle to be released from base 110. The limiting the functional orifices within base 110 may decrease the likelihood of other objects interacting with a blade and linear actuators positioned within waste management system 100.

Figure 2:
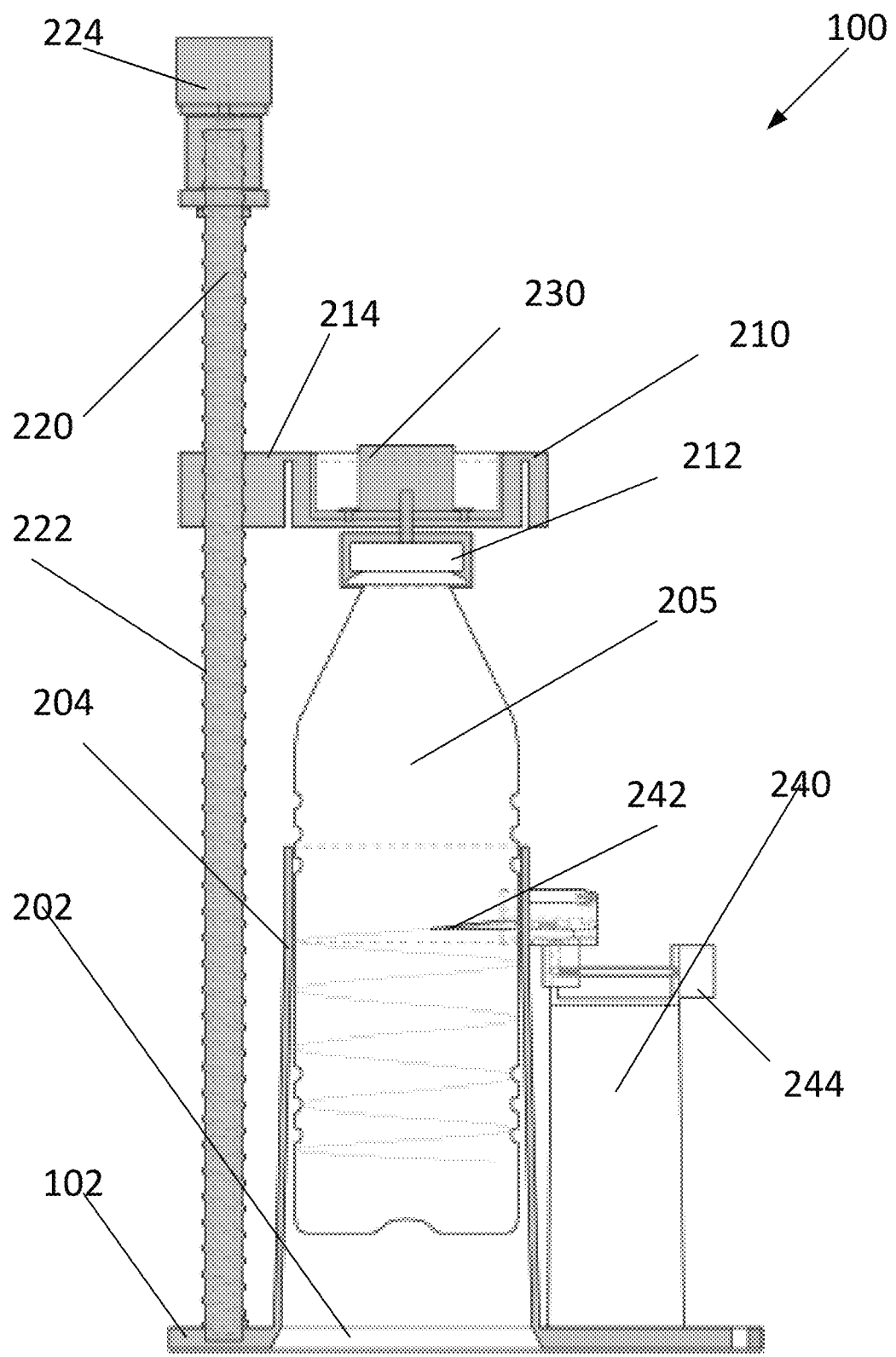
FIG. 2 depicts an internal view of waste management system, according to an embodiment.

FIG. 2 depicts an internal view of waste management system 100, according to an embodiment. As depicted in FIG. 2, waste management system 100 may include bottom end 102, internal sidewalls 204, bottle coupling mechanism 210, linear actuator 220, rotational actuator 230, and blade system 240.

Bottom end 102 may include opening 202. Opening 202 may be configured to receive bottle 205, and allow bottle 205 to move along a linear path within base 100.

Internal sidewalls 204 may be extend from an outer circumference of opening 202 towards, but not extending to, closed top end 104. Internal sidewalls 204 may act as a guide, rail, barrier, etc., which may allow bottle 205 to move along a fixed linear path while rotating. Internal sidewalls 204 may limit the lateral movement of bottle 205 within base 110 while bottle 205 is simultaneously moving along a longitudinal axis of base 110 and rotating. Furthermore, internal sidewalls 204 may include a slot that is configured to allow blade 242 to be positioned at a first location outside of the circumference of internal sidewalls 204, and at a second location within the circumference of internal sidewalls 204. This slot may be configured to limit the lateral movement of blade 242 towards a central axis of bottle 205, such that an edge of blade 242 rests on the slot. The slot may also limit the vertical movement of blade 242 while bottle 205 creates resistant forces against blade 205. Additionally, internal sidewalls 204 may be configured to help contain and safely shape the newly transformed bottom remnant of bottle 205 to stay in shape. A coil formed of the single strip of bottle 205 may be constrained by internal sidewalls 204 allowing blade 242 to consistently slice the portions of the uncut bottle.

Bottle coupling mechanism 210 may be configured to be coupled to bottle 205, linear actuator 220, and rotational actuator 230. Bottle coupling mechanism 210 may include a cap 212 that is configured to receive a neck of bottle 205, and an arm 214 that is configured to couple bottle coupling mechanism with linear actuator 220.

Cap 212 may include threads that are configured to receive the threads on the neck of bottle 205 to secure bottle 205 in place. Cap 212 may also be configured to receive forces from rotational actuator 230 to rotate cap 212 in a first direction. In embodiments, the threads of cap 212 may be configured to allow the neck of bottle 205 to be coupled to cap 212 by rotating bottle 205 in a second direction, and allow bottle 205 to be decoupled from cap 212 by rotating bottle 205 in a first direction. As such, the rotation of cap 212 via rotational actuator 230 may not assist in decoupling cap 212 and bottle 205. In embodiments, cap 212 may be an interchangeable and removable element. This may allow different thread types to be used depending on a bottle neck being coupled to cap 212. Furthermore, when coupling bottle 205 to cap 212, cap 212 and rotational actuator 230 may not allow for free spinning rotation of cap 212. Otherwise, bottle 205 may not have sufficient resistance to be able to be twisted on and securely attached to cap 212. Accordingly, cap 212 may be static to successfully couple bottle 205 in the second direction. In other embodiments, cap 212 may not include threads and may instead be configured to apply compressive forces against the neck of bottle 205.

Arm 214 may be configured to be coupled with linear actuator 220 and move linearly responsive to receiving forces from linear actuator 220. Accordingly, arm 214 may be configured to move bottle coupling mechanism 210 from a position proximate to bottom opening 202 towards an upper surface of base 100 responsive to receiving forces from linear actuator 220. In embodiments, arm 214 may be physically restricted by internal sidewalls 204 from moving closer to bottom opening 202.

Linear actuator 220 may be configured to move arm 214 along a linear path. Linear actuator 220 may be any type of actuator, such as a hydraulic actuator, pneumatic actuator, electric motor actuator, etc. Linear actuator 220 may include a linear rail system 222, linear slide, etc. and a motor 224.

Rail 222 may extend from the bottom surface 102 of base 100 to the upper surface of base 100. Motor 224 may be configured to apply forces to move bottle coupling mechanism 210 along a static rail 222. As such motor 224 provides the energy and static rail 222 provides direction/guidance, together moving arm 214 in first linear plane. In embodiments, linear actuator 220 may be configured to move arm 214 in a direction towards a bottom of base 110 and also away from the bottom of base 110.

Rotational actuator 230 may be configured to rotate cap 212 to correspondingly rotate bottle 205 in a first direction. The rotational forces generated by rotational actuator 230 may be independent but simultaneous to the forces generated by linear actuator 220. Accordingly, bottle 205 may move along a linear path while rotating. This may cause different portions of bottle 205 to be vertically and angularly aligned with blade system 240.

Blade system 240 may include blade 242 and blade actuator 244. Blade 242 includes an edge that is configured to slice a body of the bottle 205 while the bottle 205 rotates and linearly moves. The edge of the blade 242 may be configured to face a first or second direction. Preferably, blade 242 may face an angle of rotation of bottle 205. In embodiments, an edge of blade 242 may be upwardly angled.

Blade actuator 244 may be configured to move the blade 242 along a second linear axis, wherein the second linear axis is orthogonal to the first linear axis. In embodiments, an initial position that blade 242 slices bottle may be closer to the bottom of bottle 205, and a final position that blade 242 slices bottle may be closer to the neck of bottle 205. Further, in the initial position, a tip of blade 242 may be positioned outside of the circumference of bottle 205, subsequently move to be positioned within the circumference of bottle 205, and the tip of blade may be positioned outside the circumference of bottle 205 in the final position. Additionally, blade 242 may be positioned between the initial position and the final position to be positioned in a middle position. In the middle position, a different portion of the edge of blade 242 may be aligned with the circumference of bottle 205. This may allow for a longer life of blade 242.

In embodiments, blade 242 may not be positioned parallel with a ground plane, and blade 242 may have an approximate 20 degree angle tilt upwards with respect to the ground plane. The upward tilt of blade 242 to assist in the slicing of the bottle 205 when bottle 205 is rotating downward. Furthermore, while bottle 205 is moving, blade 242 may move along the second linear axis to assist in slicing bottle 205.

Figure 3:
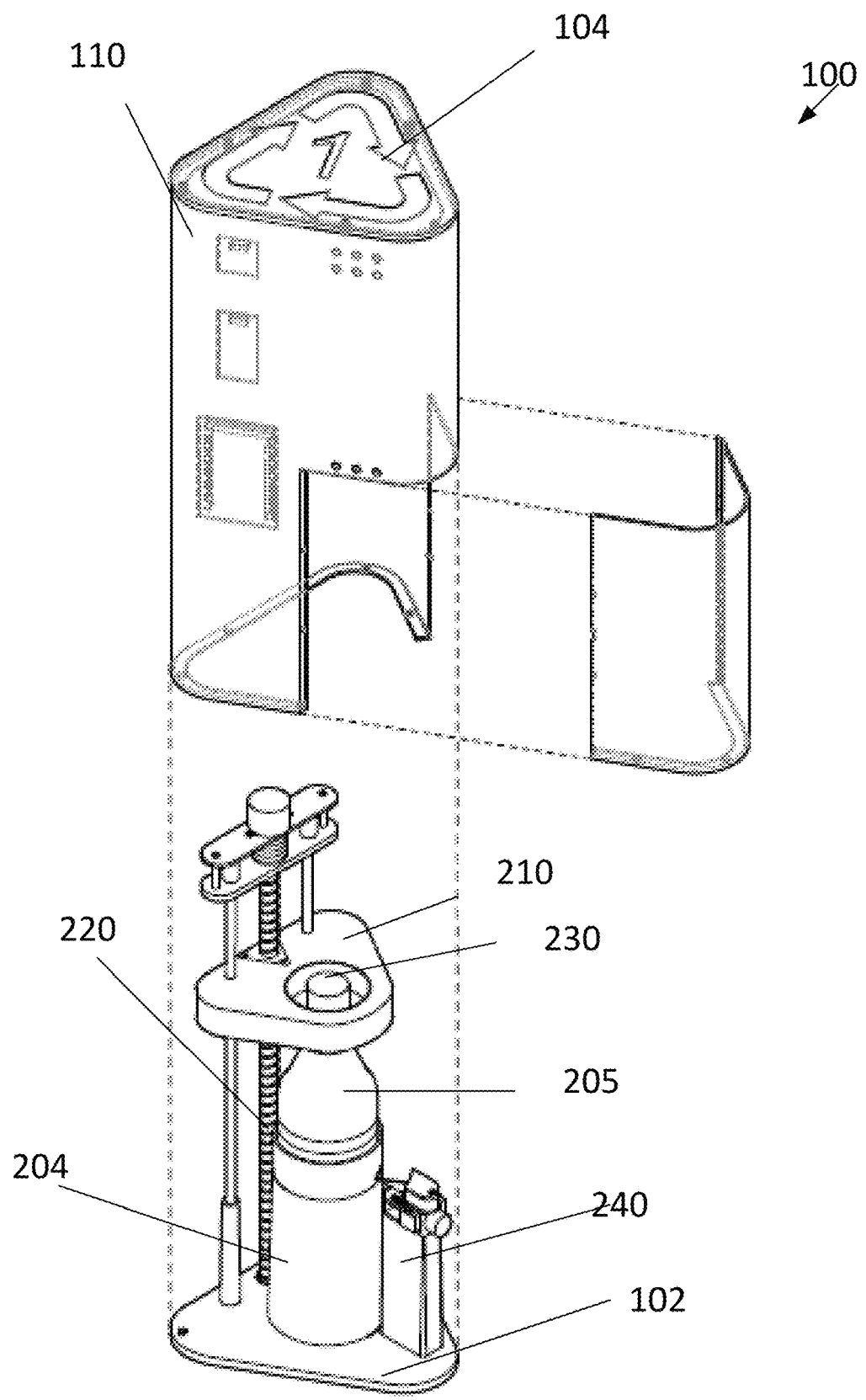
FIG. 3 depicts an exploded view of waste management system, according to an embodiment.

FIG. 3 depicts an exploded view of waste management system 100, according to an embodiment. Elements depicted in FIG. 3 may be described above, and for the sake of brevity a further description of these elements may be omitted.

As depicted in FIG. 3, base 110 may be configured to encompass the other elements of waste management system 100. Internal sidewalls 204 may extend from bottom end 102 towards upper end 104 of base. Linear actuator 220 may be configured to linearly move bottle 205 in a direction that is in parallel to the central axis of internal sidewalls 204.

Figure 4:
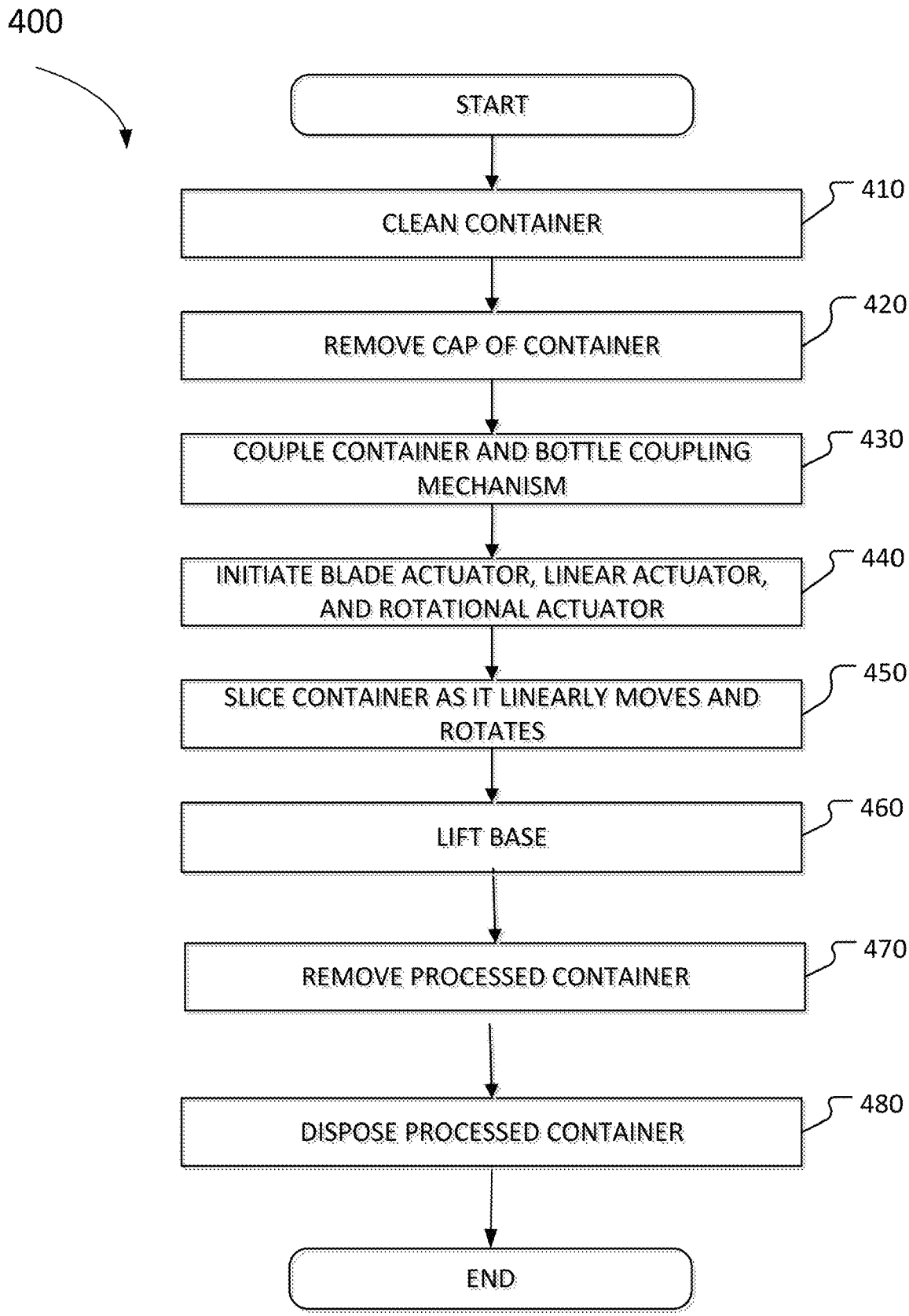
FIG. 4 depicts a method associated with a waste management system, according to an embodiment.

FIG. 4 depicts a method 400 for a waste management system 100, according to an embodiment. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At operation 410, a container may be cleaned. The container may be any device that is configured to store materials, such as a bottle, can, etc., wherein the container may be formed of plastic, metal, polymers, or any other type of materials that can be cut.

At operation 420, a cap of the container may be removed. Further, other objects, such as labels, may be removed from the outer surface of the container.

At operation 430, the container may be screwed into bottle coupling mechanism. The container may be coupled into a bottle coupling mechanism by rotating the container in a second direction. When the bottle is initialed coupled to the bottle coupling mechanism the neck of the bottle may be encompassed by the base, while the body and the bottom of the container protrude from the open bottom end of the base. Subsequently, the linear actuator may vertically move the container upward into the base. This positioning of the container may allow the blade to be initially positioned within the body, not the neck of the container, which may be advantageous based on the curvature and thicknesses of containers. Furthermore, when the bottle is initially placed within the base, a bottom of the container may be aligned with the container of the base.

At operation 440, the user may interact with a user interface to initiate the blade actuator, linear actuator, and the rotational actuator. Responsive to the user interacting with the user interface the blade actuator may move the blade towards but not crossing a central axis of the container, wherein the blade actuator may be aligned with the body of the container at a location proximate to the bottom of the container. This may align the blade with a circumference of the container, and puncture a body of the container. As such, the blade may initially not be aligned with the circumference of the container and be positioned away from the circumference of the container. Responsive to the container being punctured, the rigidity of the container may be reduced and a pressure within the chamber may be atmospheric pressure. Furthermore, after the blade actuator moves the blade, the linear actuator and the rotational actuator may simultaneously move the bottle, wherein the linear actuator may move the container in a downward direction.

At operation 450, the linear actuator and rotational actuator may continue to move the container without any human interaction. In embodiments, the linear actuator may move the container in a direction towards the bottom of the base. Responsive to the linear and rotational actuator moving the container, the stationary blade may slice the container body into a continuous strip. The linear actuator and the rotational actuator may continuously move the container until the condensing, sliced, cut, etc. a bottom of the container is aligned with the bottom end of the base. The puncturing of the container may reduce the rigidity of the container, allowing portions of the container to overlap each other while in the base.

At operation 460, the base of the waste management system may be lifted, and the container neck may be rotated in a first direction to decouple the container from the bottle coupling mechanism.

At operation 470, the container may be removed from the base. The container may include a base, a continuous strip of a body, and a neck, all while maintaining being a unitary piece.

At operation 480, the processed, condensed, sliced, etc. container may be disposed of.

In embodiments, after a bottle has been processed, the bottle may include a bottom, continuous strip, and top. The continuous strip may allow the bottle to take up less volume, while being retained in a unitary piece.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A waste management system comprising:
   a linear actuator configured to linearly move a container in a first linear axis, a central axis of the linear actuator being offset from the first linear axis;
   a rotational actuator configured to rotate the container in a first rotational direction while the linear actuator linearly moves the container along the first linear axis;
   a blade actuator configured to move a blade in a second linear axis, the second linear axis being orthogonal to the first linear axis, wherein the blade is configured to be fixed in place along the first linear axis, wherein the blade actuator is configured to move the blade along the second linear axis from a first position not aligned with a circumference of the container to a second position that is aligned with circumference of the container;
   a bottle coupling mechanism configured to be coupled to the container and the linear actuator, wherein the bottle coupling mechanism is configured to receive a threaded neck on the outer circumference of the container, the bottle coupling mechanism configured to move along the first linear actuator;
   a base with internal sidewalls that are configured to limit lateral and longitudinal movement of the container, the internal sidewalls being configured to encompass the outer circumference of the container, the internal sidewalls extending from a bottom opening of the base towards an upper surface of the base along the first linear axis.

2. The waste management system of claim 1, wherein an edge of the blade is angled towards a neck of the container.

3. The waste management system of claim 2, wherein the blade is configured to move along the second linear axis while the container moves along the first linear axis.

4. The system of claim 1, wherein the container is configured to be inserted into the bottom opening via moving the container along an axis in parallel to the first linear axis.

5. The system of claim 4, wherein the internal sidewalls are tapered to decrease a diameter across the internal sidewalls from the bottom opening towards an upper surface of the container.

6. The system of claim 5, wherein a length of the internal sidewalls is shorter than a length of the linear actuator.

7. The system of claim 6, wherein the internal sidewalls are configured to restrict the movement of the bottle coupling mechanism along the first linear axis.

8. The system of claim 4, wherein the internal sidewalls include a slot, the blade being configured to extend through the slot in the second position.

9. The system of claim 1, wherein the blade is configured to slice the container as the container moves along the first linear axis and rotates in the first rotational direction, wherein the blade slices the container in a helical pattern.

10. A method for waste management comprising:
    moving a container along a first linear axis via a linear actuator, a central axis of the linear actuator is offset from the first linear axis, wherein a base with internal sidewalls limit lateral and longitudinal movement of the container, the internal sidewalls being configured to encompass the outer circumference of the container, the internal sidewalls extending from a bottom opening of the base towards an upper surface of the base along the first linear axis;
    rotating the container in a first rotational direction via a rotational actuator while the container moves along the first linear axis within the internal sidewalls;
    moving a blade in a second linear axis via a blade actuator from a first position to a second position, wherein the blade is configured to be fixed in place along the first linear axis, the second linear axis being orthogonal to the first linear axis, the first position not being aligned with a circumference of the container, and the second position being aligned with circumference of the container;
    coupling the container and the linear actuator via a bottle coupling mechanism, wherein the bottle coupling mechanism is configured to receive a threaded neck on the outer circumference of the container, wherein the bottle coupling mechanism configured to move along the first linear actuator.

11. The method of claim 10, wherein an edge of the blade is angled towards a neck of the container.

12. The method of claim 11, further comprising:
    moving the blade along the second linear axis while the container moves along the first linear axis.

13. The method of claim 10, further comprising:
    inserting the container into a bottom opening of base, and subsequently coupling the container with the bottle coupling mechanism.

14. The method of claim 13, wherein the internal-sidewalls being tapered to decrease a diameter across the internal sidewalls from the bottom opening towards the upper surface of the container.

15. The method of claim 14, wherein a length of the internal sidewalls is shorter than a length of the linear actuator.

16. The method of claim 15, further comprising:
    restricting, via the internal sidewalls, the movement of the bottle coupling mechanism along the first linear axis.

17. The method of claim 13, wherein the internal sidewalls include a slot, and inserting the blade through the slot in the second position.

18. The method of claim 10, further comprising:
    slicing the container, via the blade, in a helical pattern as the container moves along the first linear axis and rotates in the first rotational direction.

* * * * *